United States Patent [19]

den Hollander

[11] Patent Number: 5,175,441
[45] Date of Patent: Dec. 29, 1992

[54] REMOTELY CONTROLLED POWER SUPPLY APPARATUS

[75] Inventor: Willem den Hollander, Schlieren, Switzerland

[73] Assignee: RCA Thomson Licensing Corporation, Princeton, N.J.

[21] Appl. No.: 635,828

[22] Filed: Jan. 3, 1991

[30] Foreign Application Priority Data

Jan. 5, 1990 [GB] United Kingdom ............... 9000238

[51] Int. Cl.$^5$ .................. H04N 5/44; H04B 1/16; H02J 9/00
[52] U.S. Cl. .................. 307/43; 358/194.1; 455/343
[58] Field of Search ........ 455/343, 352, 353; 358/194.1, 190; 340/825.4; 364/707; 315/411; 307/64, 66, 43, 126, 125

[56] References Cited

U.S. PATENT DOCUMENTS

| | | | |
|---|---|---|---|
| 4,340,973 | 7/1982 | Umetsu ........................... | 455/343 |
| 4,500,923 | 2/1985 | Duvall et al. .................. | 358/190 |
| 4,680,511 | 7/1987 | Fitzgerald et al. ............ | 358/194.1 |
| 4,751,580 | 6/1988 | Fitzgerald et al. ............ | 358/190 |
| 4,864,406 | 9/1989 | Hartmann et al. ............. | 358/194.1 |
| 4,975,592 | 12/1990 | Hahn et al. ................... | 358/190 |

OTHER PUBLICATIONS

Service Manual for Grundig Color Television Receiver Chassis Model Numbers CUC 5820, 5835, 5860, 5880, dated Jul. 1989.

Primary Examiner—Sharon D. Logan
Assistant Examiner—Richard T. Elms
Attorney, Agent, or Firm—Joseph S. Tripoli; Joseph J. Laks; Francis A. Davenport

[57] ABSTRACT

In a remotely controlled power supply, a switching element has a main switching section coupled to an input voltage source and an on/off control section responsive to an on/off switching signal. A main power supply includes an input side which receives main power from the source when the main switching section is in the closed position and an output side for supplying power to loads. An on/off decoder decodes a command signal having a plurality of states including a run state and a standby state to provide the aforementioned on/off switching signal. A standby power supply is coupled to the input voltage source for providing standby power to the on/off decoder during standby, whereas the switching element disconnects the main power supply from the source during standby. A second decoder decodes the other states of the command signal. The two decoders may be provided with separate system clock generators that are operated asynchronously of each other.

23 Claims, 5 Drawing Sheets

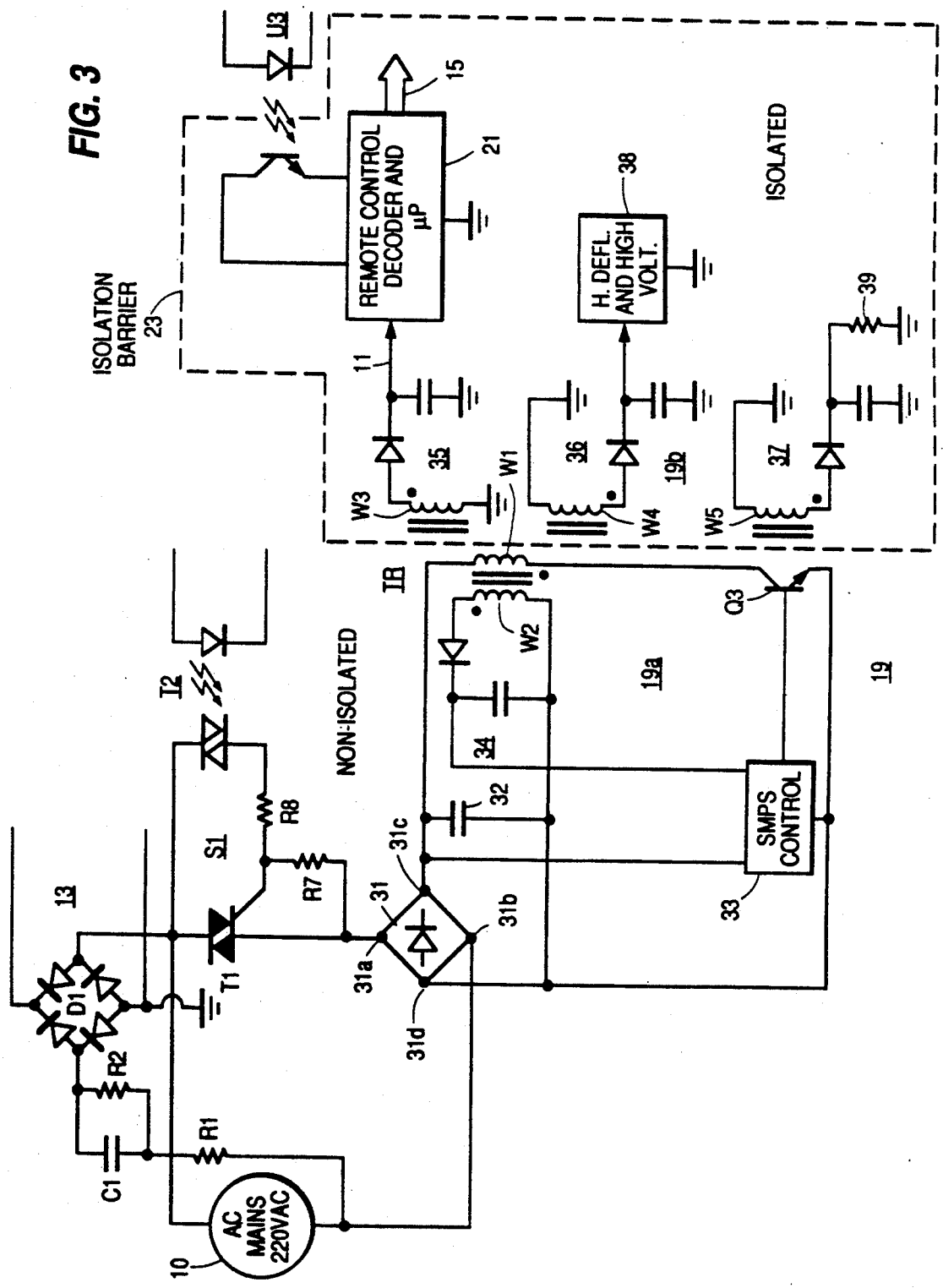

REMOTELY CONTROLLED POWER SUPPLY APPARATUS

This invention relates to remotely controlled power supplies.

The power consumption of a television receiver during standby operation may amount to somewhere between two and twenty watts. The actual power consumed depends on the way standby operation is realized in the receiver. One prior art method is to use a small power supply having a mains transformer which powers the remote control receiver and the decoder. The main power supply for the receiver is switched off by means of, e.g., an electromechanical relay. Another prior art way of providing standby operation is to unload a switched mode power supply by inhibiting the output signal of the horizontal oscillator, thereby disabling the horizontal deflection and high voltage generator energized by the power supply. In another version of a switched mode power supply, the control circuit is responsive to a decoded on/off signal and energizes the main switching section of the power supply. Disadvantageously, however, the switched mode power supply control circuit must remain energized during standby, thereby consuming substantial power during standby, in the order of several watts.

In a version of the switched mode power supply, where the secondary side of the power supply is unloaded, the power supply is placed into a burst mode of standby operation, where the power supply continues to generate standby voltages to the remote control receiver and decoder. The total power consumption of such a power supply can be quite high, since the efficiency of a switched mode power supply under low-load conditions is poor. Furthermore, because the power supply continues to deliver output voltages at increased levels, the horizontal output transistor and other components to which these output voltages are applied stay exposed to these voltages during standby. Such a condition may be undesirable from the reliability point of view.

It is desirable, therefore, to provide a remotely controlled power supply with reduced power consumption during standby, with relatively few circuits operative in that mode.

In an inventive arrangement of a remotely controlled power supply, a switching element has a main switching section coupled to an input voltage source and an on/off control section responsive to an on/off switching signal. A main power supply includes an input side which receives main power from the source when the main switching section is in the closed position and an output side for supplying power to loads. An on/off decoder decodes a command signal having a plurality of states including a run state and a standby state to provide the on/off switching signal to the control section of the switching element. A second decoder responsive to the command signal decodes other states of the command signal. A standby power supply is coupled to the input voltage source for providing standby power to the on/off decoder during standby. The switching element disconnects the main power supply from the source during the standby state so that essentially no power is supplied to the main power supply during standby.

In carrying out inventive aspects, the on/off decoder may be constructed using MOS devices. This advantageously enables the standby power supply to consume less than one watt standby power, e.g. 200 milliwatts.

In further carrying out various inventive arrangements, electrical shock hazard isolation from the AC mains voltage is preserved. To provide the required isolation, the nonisolated portions include both sections of the switching element, the input side of the main power supply and the on/off decoder. The isolated portions include the remote control decoder, the output side of the main power supply and the loads energized thereby.

In accordance with still another inventive arrangement, each of the two decoders is supplied with a system clock generator to provide the main clock signals for decoder operation. The two generators are operated asynchronously of each other. This arrangement has an advantage over an arrangement where the two decoders are synchronized in system clock generation. For example, in an environment where the on/off decoder is on one side of an isolation barrier, and the remote control decoder is on the other side, synchronous operation of the two decoders may require the use of an additional signal coupler such as a transformer or optocoupler to transfer a synchronizing signal between the two decoders across the isolation barrier. By having the two decoders use asynchronously operated system clock generators, the need for such an additional signal coupler is absent.

FIG. 1b illustrates IR receiver circuitry energized by the remotely controlled power supply of FIG. 1a;

FIG. 3 illustrates a portion of the circuitry of FIG. 1a including details of the television receiver power supply.

Figure 1A:
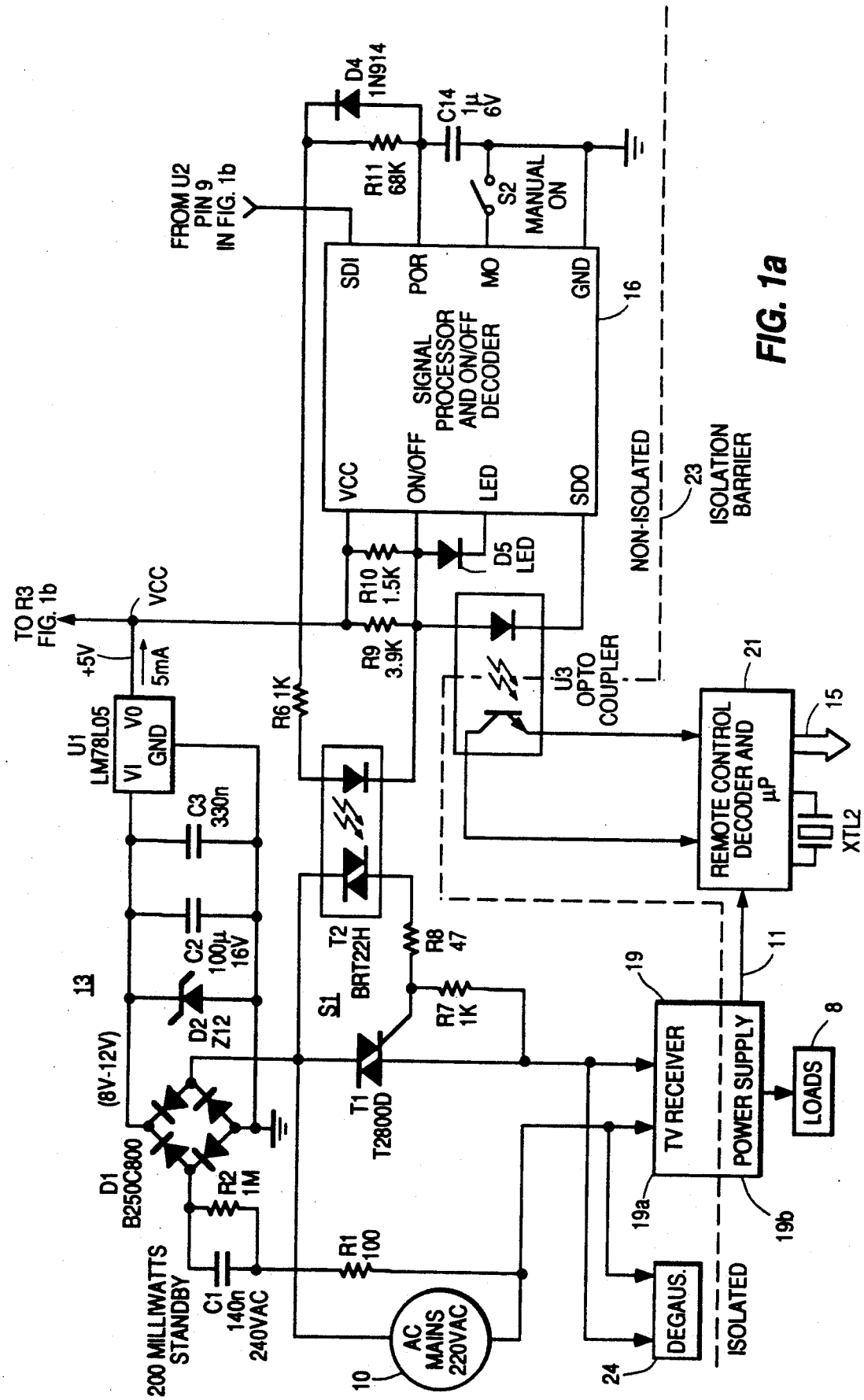
FIG. 1a illustrates a remotely controlled power supply embodying the invention.

In the remotely controlled power supply for a television receiver illustrated in FIG. 1a, a source 10 of unregulated AC mains input voltage is coupled in series with the main switching section T1 of power switch S1. Main switching section T1 comprises a triac with its gate coupled to a control section comprising an opto-triac T2.

When the main switching section is switched into the closed position, that is, when triac T1 is made conductive, AC mains voltage is supplied to the input side 19a of a main power supply 19, energizing the power supply and enabling the output side 19b to supply power to output side loads generally designated in FIG. 1a as loads 8.

Figure 1B:
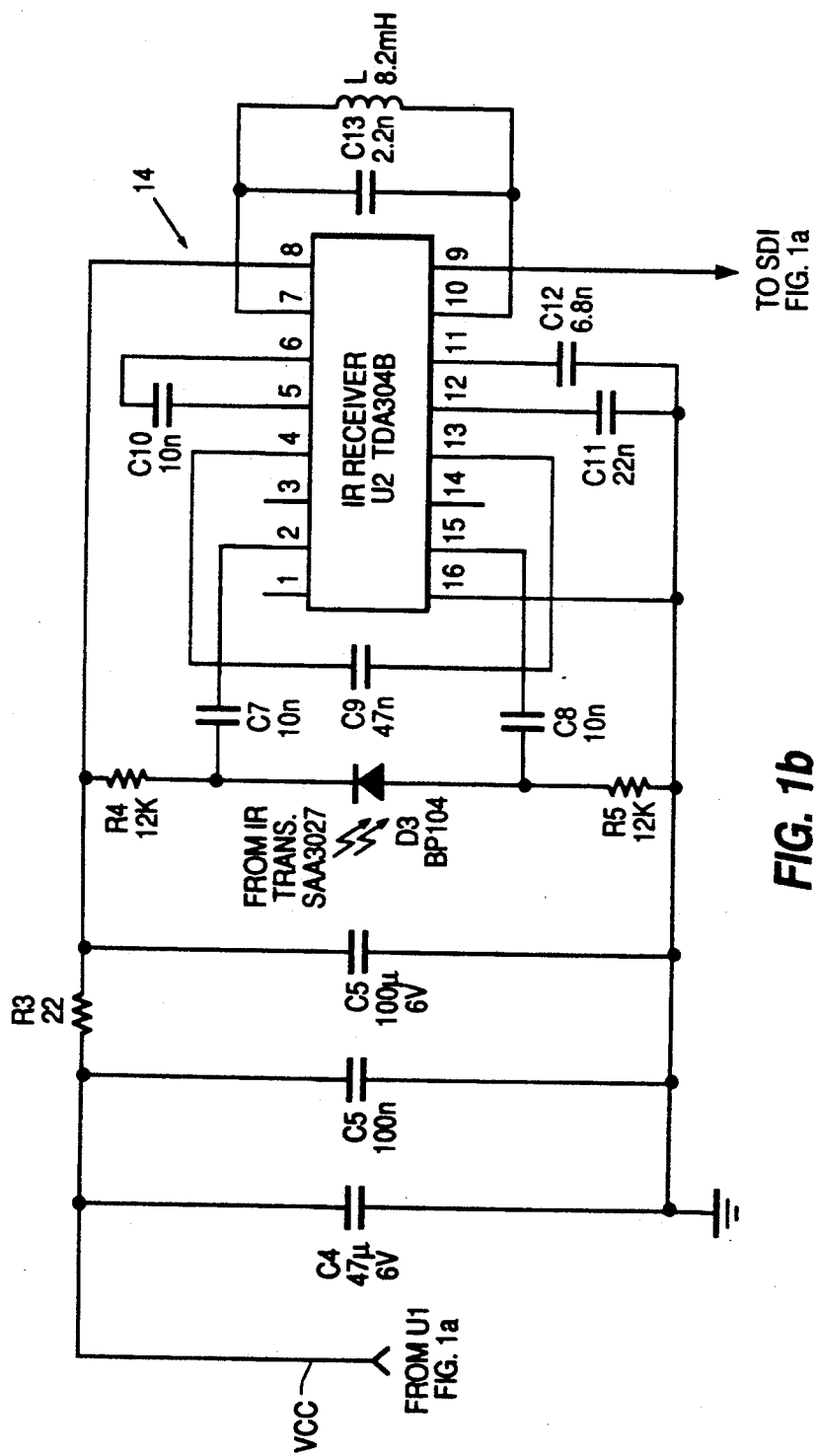

On/off control signals for triac switch T1 are provided by a signal processor and on/off decoder 16 which decodes IR remote control command signals received by an infrared receiving diode D3 of FIG. 1b. The IR command signals may be generated by a conventional IR transmitter, not illustrated in FIG. 1b. The infrared pulses modulate conduction of diode D3, and this modulated conduction is processed by an infrared receiver stage 14 that includes an IR receiver integrated circuit U2. Serial data are generated at pin 9 of integrated circuit U2 that represent a command signal code for the various television receiver commands that the viewer initiates by operating the infrared transmitter.

The command signal in serial form is coupled to a serial data in terminal SDI of decoder 16. Internal to decoder 16, the data is processed to determine whether the run state or the standby state of the command signal has been sent. If either of these states is decoded, a corresponding voltage level representing an on command or an off command is developed at an on/off terminal of decoder 16.

For example, assume the television receiver is in the standby mode of operation, triac switch T1 is open, i.e. nonconducting, and main power supply 19 is disconnected from AC mains source 10 so that essentially no power is supplied to main power supply 19 during standby. Upon decoding the run state of the command signal, the on/off switching signal at the on/off terminal of decoder 16 goes low. The diode in optotriac T2 begins conducting, biasing the triac portion of T2 into conduction, thereby providing a gating signal to main triac switch T1 turning the switch on. AC mains source 10 is connected to main power supply 19 by conduction of triac T1, thereby powering up loads 8.

Advantageously, a degaussing circuit 24 may also be connected to AC mains source 10 through triac switch T1. Thus, when triac switch T1 is made conductive when the run mode of operation is initiated, degaussing operation of the television receiver is performed.

When the viewer wishes to place the television receiver in standby, the standby state of the infrared command signal is sent by the IR transmitter, received by diode D3, processed in IR receiver U2, and supplied as serial data to on/off decoder 16 from pin 9 of integrated circuit U2 to terminal SDI of the decoder. The decoded standby state of the command signal generates the off state of on/off switching signal at the on/off terminal of decoder 16. The off state, illustratively the high state, cuts off conduction of the diode in optotriac T2, resulting in the nonconduction of the triac portion of optotriac T2 at the next zero crossing of the AC mains voltage. This results in the removal of gating pulses to triac switch T1 and places the triac in the nonconductive state at the AC mains zero crossing instant. The AC mains voltage source is disconnected from main TV power supply 19, deenergizing loads 8.

At the same time, degaussing circuit 24 is deenergized. The PTC (Positive Temperature Coefficient) elements in the degaussing circuit are permitted to cool down, thus readying the circuit for a subsequent degaussing operation when the television receiver is switched back to the run mode of operation.

Advantageously, a second decoder 21 is provided and energized via a power line 11 from output side 19b of power supply 19. This decoder remains deenergized during the standby state and becomes energized only in the run state after the main power supply 19 is energized. Remote control signal data is supplied via an optocoupler U3 to decoder 21 from a serial data output terminal SDO of signal processor and on/off decoder 16. The remote control signal data at terminal SDO contains the IR command signal information supplied by IR receiver stage 14.

After remote control decoder 21 becomes powered-up, it decodes states of the command signal other than run and standby to initiate such operations as channel selection, volume control, and the like. To this end, remote control decoder 21 includes a microprocessor that generates appropriate control signals on signal lines 15. These signals are sent to the appropriate television receiver circuits which perform the controlled operations.

A standby power supply 13, to be further described, provides an operating voltage VCC during standby to energize the circuitry needed to decode the run and standby states of the IR command signal and generate the on/off switching signal. Thus, in FIG. 1, standby power supply 13 provides operating power to signal processor and on/off decoder 16 and IR receiver stage 14 of FIG. 1b.

Circuits requiring power during standby are those circuits needed to process the IR command signal and to decode the run/standby states. By making use of MOS technology, the on/off decoder circuitry may be constructed using MOS devices. The amount of power consumed by the MOS decoding circuitry is thus very small, on the order of 10 milliwatts, based on a VCC standby voltage of +5 volts and a current consumption of 2 milliamperes. IR receiver integrated circuit U2, being a CMOS IC, also consumes very little power during standby, approximately 10 milliwatts based on a current consumption for IR receiver stage 14 of 2 milliamperes. Because a separate on/off decoder 16 is provided, remote control decoder and microprocessor 21 may be deenergized during standby, relieving standby power supply 13 of the need to power the microprocessor.

Because it is not necessary for main power supply 19 to provide power during standby, it may be disconnected by switch T1 from AC mains source 10 during standby. Thus, in contrast to some prior art circuits, main power supply 19 consumes essentially no power during standby, and the total power supplied by AC mains source 10 is less than one watt, i.e., around 200 milliwatts.

FIG. 3 illustrates a portion of the remotely controlled power supply of FIG. 1a, including details of main power supply 19. In FIG. 3, the input side of power supply 19 includes a full wave bridge rectifier 31 having input terminals 31a and 31b coupled respectively to triac switch T1 and to the terminal of AC mains source 10 remote from the triac. The full wave rectified voltage at an output terminal 31c of the bridge rectifier is filtered by a capacitor 32, which is also coupled to a current return terminal 31d of the bridge rectifier.

Main power supply 19 may be of the switched mode type which includes a transformer TR having a primary winding W1 and secondary windings W2 through W5. A switching transistor Q3 is coupled to primary winding W1 and is controlled in conduction by a control circuit 33. Start-up voltage for control circuit 33 is obtained from bridge rectifier terminal 31c.

The switch mode power supply is operated in a flyback converter mode, and the regulated voltages across the secondary windings during the flyback interval are rectified and filtered by circuits which form DC secondary supply voltage sources 34-37. Secondary supply voltage source 34 provides operating power to control circuit 33 after start-up. Similarly, secondary supply voltage sources 35-37 provide operating power to load circuits such as remote control decoder and microprocessor 21, horizontal deflection and high voltage circuit 38, and other load circuits generally designated 39 in FIG. 3, such as the various integrated circuits used by a television receiver.

When optotriac T2 of FIG. 3 receives the off state of the on/off switching signal from decoder 16 of FIG. 1a, triac switch T1 becomes nonconductive at the next mains voltage zero crossing, disconnecting AC mains source 10 from bridge rectifier 31 of switch mode power supply 19. Because remote control decoder and microprocessor 21 is relieved of the on/off decoding function, standby power supply 13 need not be operatively connected to either remote control decoder and microprocessor 21 nor control circuit 33 of switched mode power supply 19. Both the microprocessor and the control circuit essentially remain deenergized during standby.

When designing the remotely controlled power supply of FIG. 1a, electrical shock hazard isolation from AC mains source 10 must be taken into account. By having only a minimum number of circuits powered during standby and requiring only on/off function decoding during standby, the partitioning of circuits between the isolated side and nonisolated side of an isolation barrier is greatly simplified. As illustrated in FIGS. 1a and 1b, the following elements are placed on the nonisolated side of the barrier: signal processor and on/off decoder 16, IR receiver stage 14, power switch S1, degaussing circuit 24, the input side 19a of main power supply 19, and standby power supply 13. The remaining circuits of the television receiver, other than optocoupler U3, may be placed on the isolated side of isolation barrier 23. These circuits include the output side 19b of power supply 19 and remote control decoder and microprocessor 21.

Because on/off decoder 16 is located on the nonisolated side, power to the decoder from AC mains supply 10 is not being transferred across an isolation barrier. This advantageously avoids the need for a mains isolation transformer in the standby power supply.

The point of main power transfer across an isolation barrier occurs in main power supply 19 from input side 19a to output side 19b. In the switched mode power supply realization of FIG. 3, the isolation barrier is located in transformer TR between primary winding W1 and the isolated secondary supply windings W3-W5. Winding W2, which supplies power to the switched mode power supply control circuit 33, is on the nonisolated side.

As an additional advantageous feature, only one point of small signal crossover across the isolation barrier is required. This point of crossover is via optocoupler U3 which transfers the remote control command data developed at serial data output terminal SDO to remote control decoder and microprocessor 21.

Advantageously, the on/off signal flow path is entirely on the non-isolated side of isolation barrier 23. Thus, the on/off switching signal developed by on/off decoder 16 is coupled to the gate of triac T1 through a control section T2 which requires no isolation barrier. The use of an optotriac as the control section T2 is advantageous because the optotriac may incorporate a zero voltage switching circuit, which can readily supply pulses to the floating gate of triac T1.

Because the power requirements of the standby loads on standby power supply 13 are extremely low, less than one watt, i.e., 25 milliwatts, standby power supply 13 may incorporate a nonresistive impedance, capacitor C1, of moderate size, to reduce the amplitude of the mains voltage applied to a small bridge rectifier D1 in order to obtain a low amplitude DC voltage. Capacitor C1 takes up the difference in the two amplitudes. A Zener diode D2 provides overvoltage protection for a voltage stabilizer U1, which provides the regulated standby voltage VCC. A small current limiting resistor R1 is placed in series with capacitor C1, and a very large resistor R2 is coupled across the capacitor to provide a small but continuous discharge current.

Figure 2A:
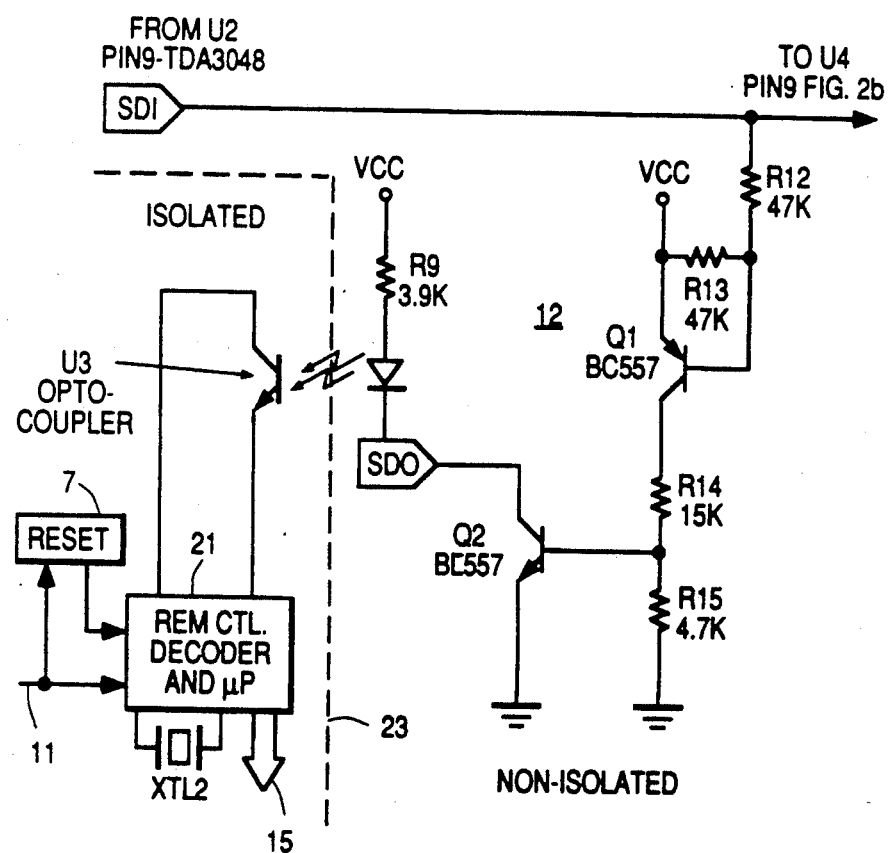
FIGS. 2a and 2b illustrate a portion of the circuitry of FIG. 1a, with a detailed illustration of the signal processor and on/off decoder.
Figure 2B:
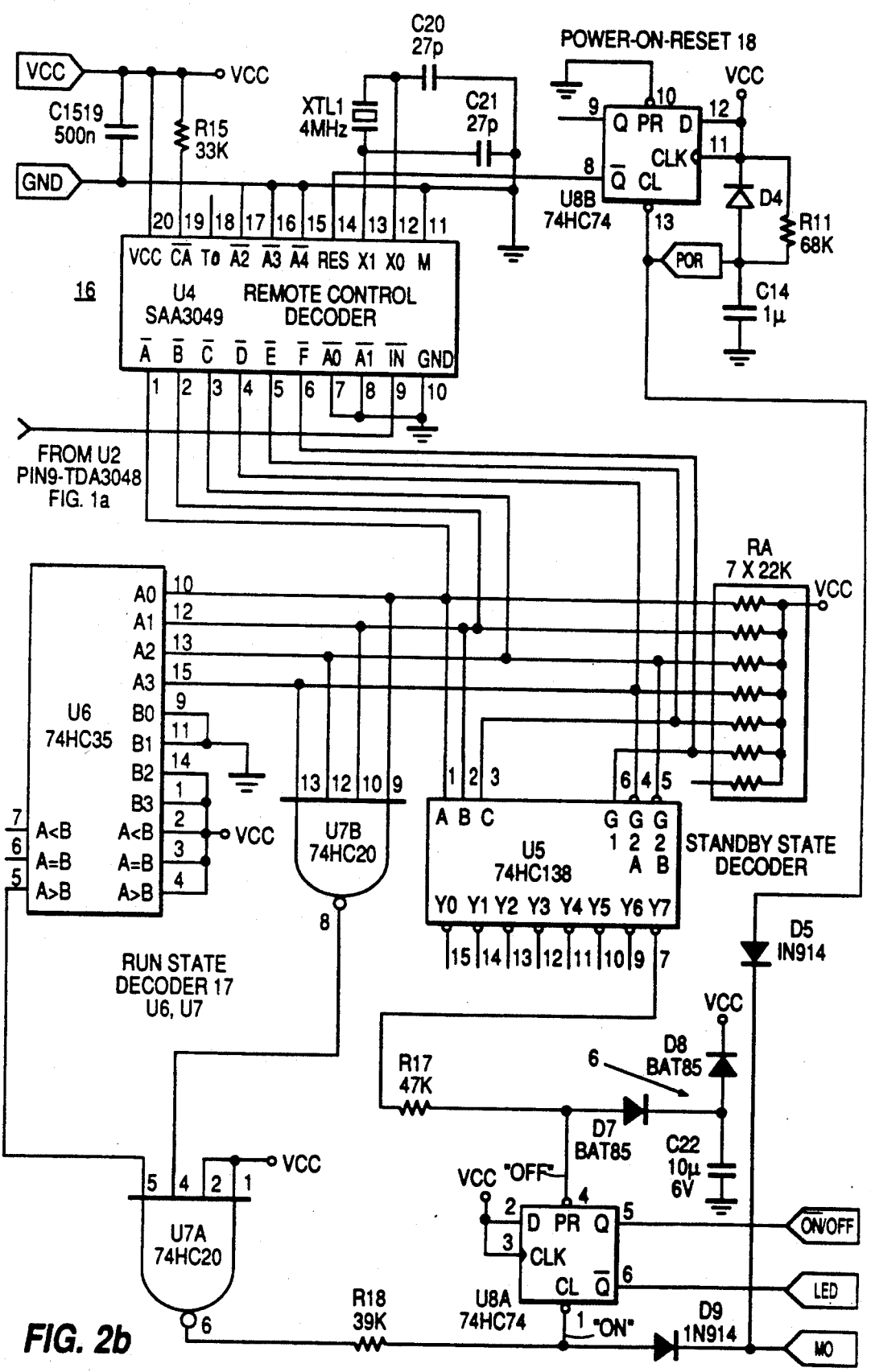

FIGS. 2a and 2b illustrate a portion of the circuitry of FIG. 1 showing details of signal processor and on/off decoder 16. The IR command signal, in serial data form, obtained at pin 9 of IR receiver integrated circuit U2 of FIG. 1b, is coupled to input pin 9 of a remote control decoder U4. Because decoder 16 requires only an on/off decoding function, a simple remote control decoder such as the CMOS integrated circuit SAA 3049 rather than a complex microprocessor, may be used as decoder U4 of FIG. 2b. Decoder U4 processes the remote control serial data, checks the validity of the data, and converts the data into complementary, six bit parallel form at pins 1-6.

When, by way of example, the integrated circuit SAA 3027 is used in the transmitter, the standby state of the command signal is transmitted as the digital code 001100. The run state of the command signal is represented by any one of the digital codes 000000 through 001011. That is to say, pressing any one of several buttons on the transmitter, such as any one of the channel number buttons, as well as pressing the on/off button, is considered a command which indicates that the viewer wishes to turn the television receiver on.

To decode the run state of the command signal, a run state decoder 17 is provided. Decoder 17 comprises a CMOS logic comparator U6 and a CMOS dual NAND gate IC that can be partitioned into two gates U7A and U7B. The four most significant bits generated at pins 1-4 of remote control decoder U4 are coupled to NAND gate U7B and to the A0–A3 input pins of logic comparator U6. The A>B output pin 5 of U6 and the output of NAND gate U7B are applied as inputs to NAND gate U7A.

When decoder 17 detects the run state of the IR command signal, its output at pin 6 of NAND gate U7A goes low providing a clear or reset signal to the CL pin of a CMOS D type flip-flop U8A. U8A is one of two flip-flops, U8A and U8B, that are part of a CMOS dual D type flip-flop integrated circuit. Clearing the D type flip-flop U8A resets its Q output low. A low Q output produces the on state of the on/off switching signal for triac driver T2 of FIG. 1a. The result is that triac switch T1 of FIG. 1a becomes conductive, enabling main power supply 19 to be energized by the AC mains source 10 and turn on the television receiver.

To decode the standby state of the IR command signal, a 3-to-8 line CMOS decoder U5 is provided. Data output pins 1, 2 and 5 of remote control decoder U4 are respectively coupled to the three input line pins 1–3 of U5. Parallel output data pins 3, 4 and 6 of remote control decoder U4 are coupled to enable pins 5, 4 and 6, respectively, of U5.

When the 001100 digital code representing the standby state of the IR command signal is received, the Y7 output of standby state decoder U5 goes low. The Y7 output is coupled to the preset input PR of flip-flop U8A. When output Y7 goes low, U8A presets its Q output high and its NOT Q output low. When the Q output goes high, asserting the off state of the on/off switching signal, the driver portion of triac driver T2 becomes nonconducting at the next AC mains zero crossing. Gating signals for triac switch T1 are removed, disconnecting main power supply 19 from AC mains source 10 and turning the television receiver off into a standby mode of operation.

An indication that the television receiver is in the standby mode of operation may be provided by coupling a light emitting diode D5 of FIG. 1a to the NOT Q output of flip-flop U8A, via terminal LED of on/off decoder 16. In the standby state, with the NOT Q output low, current flows through light-emitting diode D5 to provide the required indication. The current needed by light-emitting diode D5 is very small, on the order of one milliampere, and thus produces very little additional loading on standby power supply 13.

A power-on-reset circuit 18 comprises D-type flip-flop U8B operating as an inverter, a capacitor C14 coupled to the clear input CL, and a resistor R11 paralleled by a diode D4 coupled to capacitor C14 and VCC. Resistor R11 and capacitor C14 form a relatively short time constant circuit. The NOT Q output of flip-flop U8B is coupled to the RES input of decoder U4 and is used to reset the decoder. A delayed power-on-reset circuit 6, including resistor R17, capacitor C22 and diodes D7 and D8, presets the Q output of flip-flop U8A to the off state. The delay is provided by the longer time constant circuit formed by resistor R17 and capacitor C22.

Manual-on operation may be provided by means of a single pole, single throw switch S2, of FIG. 1a, which, in the closed position, grounds the reset input CL of flip-flop U8A via a diode D9. Decoder U4 must also be reset to clear its output, which, if not cleared, would inhibit clearing flip-flop U8A. For this purpose, manual-on switch S2 is also coupled to the clear input CL of power-on-reset flip-flop U8B, via a diode D6.

In FIG. 2a, the serial IR command data at terminal SDI, generated by IR receiver integrated circuit U2, is passed on via optocoupler U3 to remote control decoder and microprocessor 21 after the microprocessor powers up in the run mode. An amplifier stage 12 may be inserted between serial data in terminal SDI and the diode input to optocoupler U3 to provide sufficient drive level for the optocoupler. If the IR receiver integrated circuit is capable of delivering sufficient drive, then driver stage 12 may be dispensed with.

Remote control decoder 21 is located on the nonisolated side of isolation barrier 23 and remote control decoder U4, used for on/off decoding, is located on the nonisolated side. Each decoder has its own independently operated power-on-reset circuit, circuit 18 for decoder 16 and a circuit 7 of FIG. 2a for decoder 21. Each of the two reset circuits detects the occurrence of an interruption in AC mains voltage and provides a reset signal for use by each of the two decoders.

Each decoder also has its own independently operated system clock generator for generating the main system clock for the decoder logic. These system clock generators are designated in FIG. 2b by XTL1 for on/off decoder U4 and in FIG. 2a by XTL2 for remote control decoder and microprocessor 21. Both decoders are capable of decoding asynchronously applied command signal data. This permits both system clock generators XTL1 and XTL2 to be operated asynchronously of each other. Advantageously, this avoids the need for another signal coupling element to transfer synchronizing information across an isolation barrier.

What is claimed is:

1. Remotely controlled power supply apparatus, comprising:
   switching means having a main switching section coupled to an input voltage source, and having an on/off control section responsive to an on/off switching signal;
   a main power supply including an input side which receives main power from said source when said main switching section is in the closed position and an output side for supplying power to loads;
   an on/off decoder for decoding a command signal having a plurality of states including a run state and a standby state to provide said switching signal to the control section of said switching means, said switching signal having on and off states corresponding to the run and standby states of said command signal so that when the run state of said command signal is decoded, the main switching section of the switching means is placed in the closed position for energizing the main power supply to supply power to said loads;
   a remote control decoder responsive to said command signal for decoding a state of said command signal other than the run and standby states; and
   a standby power supply coupled to said source for providing standby power to said on/off decoder during the standby state of said command signal,
   said switching means disconnecting said main power supply from said source during said standby state so that essentially no power is supplied to said main power supply during said standby state.

2. Apparatus according to claim 1 wherein said on/off decoder is constructed using MOS device to enable said standby power supply to consume less than one watt standby power when energizing all loads that are powered therefrom during the standby state.

3. Apparatus according to claim 2 wherein said main switching section disconnects said main power supply during the standby state so that essentially no power is supplied to any circuitry other than the standby power supply.

4. Apparatus according to claim 3 including a degaussing circuit coupled to said main switching section and disconnected thereby from said source during the standby state and consuming essentially no power during that state.

5. Apparatus according to claim 3 wherein said main power supply comprises a switched mode power supply having a power regulator switch and regulator control circuitry therefor as part of said input side and having a rectifying and filtering arrangement as part of said output side, said regulator control circuitry being disconnected from the input voltage source during the standby state by the main switching section.

6. Apparatus according to claim 3 wherein said remote control decoder comprises one of said loads and remains deenergized during the standby state-becoming energized only in the run state after the main power supply is energized.

7. Apparatus according to claim 3 wherein said switching means includes a triac main switching section in series with an AC mains voltage supplied by said source and a driver circuit for the triac responsive to said switching signal.

8. Apparatus according to claim 7 wherein said driver circuit comprises an optotriac.

9. Apparatus according to claim 1 wherein said on/off decoder is constructed using MOS devices to enable the total power supplied by said input voltage source to be less than one watt during the standby state.

10. Apparatus according to claim 1 wherein said on/off decoder and said remote control decoder have system clock generators operated independently and asynchronously of each other.

11. Apparatus according to claim 1 wherein the following are nonisolated from said input voltage source:

said main switching section of said switching means,
said on/off control section of said switching means,
said input side of said main power supply,
said on/off decoder, and
said standby power supply;
and wherein the following are isolated from said input voltage source:
said output side of said main power supply,
said loads, and
said remote control decoder.

12. Apparatus according to claim 11 including signal coupling means constructed with an isolation barrier for coupling a remote control signal derived from said command signal through said barrier to said remote control decoder.

13. Apparatus according to claim 12 including an infrared receiver responsive to said command signal transmitted as an infrared signal, said receiver being nonisolated from said source and energized by said standby power supply for generating said remote control signal.

14. Apparatus according to claim 12 wherein said signal coupling means comprises an optocoupler.

15. Apparatus according to claim 1 wherein each of the two decoders is provided with power-on-reset circuitry which detects the occurrence of an interruption in the supply of voltage from the input voltage source.

16. Apparatus according to claim 15 including a manual on switch coupled to said on/off decoder for changing between the on and off states of said switching signal.

17. Apparatus according to claim 16 wherein said manual-on switch is coupled to the on/off decoder power-on-reset circuitry and activates this circuitry when the manual-on switch is operated.

18. Apparatus according to claim 1 wherein said on/off switching signal is passed from said on/off decoder to said switching means entirely within a nonisolated side of an isolation barrier associated with said input voltage source.

19. Apparatus according to claim 18 including means for coupling a remote control signal derived from said command signal across said isolation barrier to said remote control decoder located on an isolated side.

20. Apparatus according to claim 2 wherein said standby power supply includes a capacitor in series with an AC mains voltage supplied by said source and a rectifier arrangement coupled to said capacitor to generate a DC voltage of substantially lower amplitude than the amplitude of said AC mains voltage.

21. Apparatus according to claim 2 wherein said standby power supply includes a nonresistive impedance coupled to an AC mains voltage supplied by said source and a rectifier arrangement which generates a DC voltage of substantially lower amplitude than the amplitude of said AC mains voltage, said impedance substantially taking up the difference in the two amplitudes.

22. Remotely controlled power supply apparatus, comprising:
switching means having a main switching section coupled in series with and nonisolated from an input voltage source, and having an on/off control section therefor similarly nonisolated from said source;
a main power supply incorporating an isolation barrier between an input side which is nonisolated from said source and which receives main power therefrom when said main switching section is in the closed position and an output side isolated from said source for supplying power to isolated loads;
an on/off decoder nonisolated from said source for decoding a command signal having a plurality of states including a run state and a standby state to provide a switching signal to the control section of said switching means, said switching signal having on and off states corresponding to the run and standby states of said command signal so that when the run state of said command signal is decoded, the main switching section of the switching means is placed in the closed position for energizing the main power supply to supply power to the isolated loads;
a remote control decoder isolated from said source and responsive to said command signal for decoding a state of said command signal other than the run and standby states; and
a standby power supply coupled to and nonisolated from said source for providing standby power to said on/off decoder during the standby state of said command signal,
said switching means disconnecting said main power supply from said source during said standby state so that essentially no power is supplied to said main power supply during said standby state.

23. Remotely controlled power supply apparatus, comprising:
a main power supply responsive to an on/off signal, including an input side which receives main power from an input voltage source and an output side for supplying power to loads;
an on/off decoder for decoding a command signal having a plurality of states including a run state and a standby state to generate said on/off signal to control operation of said main power supply so that when the run state of said command signal is decoded, the main power supply is energized to supply power to the said loads;
a standby power supply coupled to said source for providing standby power to said on/off decoder during the standby state of said command signal;
a remote control decoder responsive to said command signal for decoding a state of said command signal other than the run and standby states; and
first and second system clock generators coupled to said on/off and remote control decoders, respectively, for providing main clock signals that are generated asynchronously of each other.

* * * * *